US011687386B2

(12) United States Patent
Sodagar

(10) Patent No.: US 11,687,386 B2
(45) Date of Patent: Jun. 27, 2023

(54) MPD VALIDITY EXPIRATION PROCESSING MODEL

(71) Applicant: TENCENT AMERICA LLC, Palo Alto, CA (US)

(72) Inventor: Iraj Sodagar, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/366,189

(22) Filed: Jul. 2, 2021

(65) Prior Publication Data

US 2022/0107854 A1 Apr. 7, 2022

Related U.S. Application Data

(60) Provisional application No. 63/088,681, filed on Oct. 7, 2020.

(51) Int. Cl.
| | |
|---|---|
| *G06F 9/54* | (2006.01) |
| *H04N 21/845* | (2011.01) |
| *H04N 21/266* | (2011.01) |
| *H04N 21/84* | (2011.01) |
| *H04N 21/24* | (2011.01) |
| *H04L 65/70* | (2022.01) |

(52) U.S. Cl.
CPC .............. *G06F 9/542* (2013.01); *H04L 65/70* (2022.05); *H04N 21/2402* (2013.01); *H04N 21/266* (2013.01); *H04N 21/84* (2013.01); *H04N 21/8456* (2013.01)

(58) Field of Classification Search
None
See application file for complete search history.

(56) References Cited

U.S. PATENT DOCUMENTS

2012/0023253 A1* 1/2012 Rhyu .............. H04N 21/23439
709/231
2013/0042015 A1 2/2013 Begen et al.
(Continued)

FOREIGN PATENT DOCUMENTS

WO 2018/069357 A1 4/2018

OTHER PUBLICATIONS

International Search Report dated Nov. 2, 2021 in International Application No. PCT/US21/44934.
(Continued)

*Primary Examiner* — James R Marandi
(74) *Attorney, Agent, or Firm* — Sughrue Mion, PLLC

(57) ABSTRACT

There is included a method and apparatus comprising computer code configured to cause a processor or processors to perform obtaining video data, creating, based on the video data, a timed metadata track indicating a segment bandwidth and comprising information of a plurality of aligned segments of a media adaptation set such that duration information and size information of each of the aligned segments are included in at least one metadata sample, switching to one of a plurality of representations of the video data based on whether the timed metadata track indicates at least an overflow to an input buffer per each of the plurality of representations, and delivering the one of the plurality of representations to a client as a part of an event stream and based on at least one mode indicated in the event stream.

20 Claims, 14 Drawing Sheets

(56) References Cited

U.S. PATENT DOCUMENTS

| | | | | |
|---|---|---|---|---|
| 2015/0026358 A1* | 1/2015 | Zhang | ................... | H04N 21/84 |
| | | | | 709/231 |
| 2016/0315956 A1* | 10/2016 | Giladi | ..................... | H04L 65/75 |
| 2017/0134466 A1* | 5/2017 | Giladi | .............. | H04N 21/26258 |
| 2019/0104332 A1* | 4/2019 | Hirabayashi | ....... | H04N 21/2407 |
| 2019/0230419 A1* | 7/2019 | Yamagishi | ........... | H04N 21/814 |
| 2019/0349630 A1* | 11/2019 | Stockhammer | .. | H04N 21/85406 |
| 2021/0105542 A1* | 4/2021 | Stockhammer | ....... | H04L 65/752 |

OTHER PUBLICATIONS

Written Opinion of the International Search Report dated Nov. 2, 2021 in International Application No. PCT/US21/44934.

"DASH Player's Application Events and Timed Metadata Processing Models and APIs (Community Review)", DASH Industry Forum, Living Document, 2020, Retrieved from: URL: <https://dashif-documents.azurewebsites.net/Events/master/event.html> (24 pages total).

"Potential improvement for ISO/IEC 23009-1 4th edition DAM 1 CMAF support, events processing model and other extensions", ISO/IEC JTC 1/SC 29/WG 11 Coding of moving pictures and audio, Jul. 14, 2020, 68 pages, N19463 68 pages.

Extended European Search Report dated Nov. 4, 2022 in European Application No. 21878170.6.

\* cited by examiner

```
class ComboIndexMetaDataSampleEntry()
    extends MetaDataSampleEntry ('comi') {
    ComboIndexConfigurationBox();
}
aligned(8) class ComboIndexConfigurationBox
    extends FullBox('comi', version = 0, flags = 0) {
    unsigned int(16) num_tracks;
    unsigned int (15) reserved;
    bit (1)          quality_indicator_flag;
    if (quality_indicator_flag) {
        string quality_identifier;
    }
    for(i=1; i <= num_tracks; i++) {
        unsigned int(32) track_id;
    }
    if (quality_indicator_flag) {
        unsigned int(16) quality;
    }
}
```

```
class ComboIndexStruct () {
    bit(1)           segment_start_flag;
    unsigned int(3)  SAP_type;
    bit(1)           marker;
    bit(1)           emsg_flag;
    bit(1)           prft_flag;
    unsigned int(25) reserved;

bit(1)           known_duration_flag;
    bit(1)           exact_duration_flag;
    bit(4)           duration_variation;
    unsigned int(26) reserved;
    unsigned int(32) duration;
    unsigned int(32) timescale;

for(i=1; i <= num_tracks; i++) {
        unsigned int(32) start;
        unsigned int(32) size;
        unsigned int(16) quality;
        bit(1) missing;
        unsigned int(15) reserved;
    }
}
```

MPD VALIDITY EXPIRATION PROCESSING MODEL

CROSS REFERENCE TO RELATED APPLICATION

The present application claims priority to provisional applications U.S. 63/088,681, filed on Oct. 7, 2020, the contents of which are hereby expressly incorporated by reference, in their entirety, into the present application.

BACKGROUND

1. Field

The present disclosure is directed to dynamic adaptive streaming over HTTP (DASH) signaling and more specifically to processing, such as by a processing model for media presentation description (MPD) validity expiration events over a DASH client.

2. Description of Related Art

The Moving Picture Experts Group (MPEG) DASH may provide a standard for streaming multimedia content over IP networks, and a DASH client processing model thereof for application events is technically insufficient due to at least special cases in one or more event streams. MPEG DASH provides a standard for streaming multimedia content over IP networks. ISO/IEC 23009-1 DASH standard allows the streaming of the multi-rate content. However, even if a DASH client may pick segments among multiple representations of the same content based on the available network bandwidth and the amount of its buffer fullness, while the DASH standard provides a way to describe the average bandwidth of each representation, there is no provision of the instantaneous bandwidth fluctuation of segments in a single representation, and therefore, even if an average bitrate of representation were given, it may occur that a size of segments in bytes are much larger than an expected bandwidth such that downloading that segment may overflow a client input buffer. Further, even if the MPEG DASH provides a standard supporting signaling of MPD and inband events in MPD, such standard does not provide at least a processing model for MPD Validity Expiration events that are aligned with the DASH application event processing model and as such, there are technically insufficient features with such standard.

SUMMARY

To address one or more different technical problems, this disclosure provides technical solutions to reduce network overhead and server computational overheads while delivering an option to apply various operations to the resolved element such that in using these operations some of practicality and technical signaling features thereof may be improved.

There is included a method and apparatus comprising memory configured to store computer program code and a processor or processors configured to access the computer program code and operate as instructed by the computer program code. The computer program code comprises obtaining code configured to cause the at least one processor to obtain video data, creating code configured to cause the at least one processor to create, based on the video data, a timed metadata track indicating a segment bandwidth and comprising information of a plurality of aligned segments of a media adaptation set such that duration information and size information of each of the aligned segments are included in at least one metadata sample, switching code configured to cause the at least one processor to switch to one of a plurality of representations of the video data based on whether the timed metadata track indicates at least an overflow to an input buffer per each of the plurality of representations, and delivering code configured to cause the at least one processor to deliver the one of the plurality of representations to a client to a client as a part of an event stream and based on at least one mode indicated in the event stream.

According to exemplary embodiments, there is further determining code configured to cause the at least one processor to determine whether the at least one mode is an on-receive mode.

According to exemplary embodiments, there is further determining code is further configured to cause the at least one processor to determine, in a case where it is determined that the at least one mode is the on-receive mode, whether event message (emsg) information of the event stream indicate one or more of a first version emsg and a second version emsg.

According to exemplary embodiments, there is further setting code configured to cause the at least one processor to set, in a case that the first version emsg is determined, presentation time information of an event of the event stream to zero in response to determining that at least one of a presentation time field and an event duration field of the event stream are zero.

According to exemplary embodiments, there is further setting code configured to cause the at least one processor to set, in a case that the first version emsg is determined, message data of an event of the event stream to a predetermined message in response to determining that at least one of a presentation time field and an event duration field of the event stream are zero.

According to exemplary embodiments, there is further setting code configured to cause the at least one processor to set, in a case that the first version emsg is determined, both presentation time information of an event of the event stream to zero and message data of an event of the event stream to a predetermined message in response to determining that at least one of a presentation time field and an event duration field of the event stream are zero.

According to exemplary embodiments, there is further setting code configured to cause the at least one processor to set, in a case that the second version emsg is determined, presentation time information of an event of the event stream to zero in response to determining both that a presentation time field is equal to another presentation time and also that an event duration field is equal to zero.

According to exemplary embodiments, there is further setting code configured to cause the at least one processor to set, in a case that the second version emsg is determined, message data of an event of the event stream to a predetermined message in response to determining both that a presentation time field is equal to another presentation time and also that an event duration field is equal to zero.

According to exemplary embodiments, there is further setting code configured to cause the at least one processor to set, in a case that the second version emsg is determined, both presentation time information of an event of the event stream to zero and also message data of an event of the event stream to a predetermined message in response to determining both that a presentation time field is equal to another presentation time and also that an event duration field is equal to zero.

BRIEF DESCRIPTION OF THE DRAWINGS

Further features, nature, and various advantages of the disclosed subject matter will be more apparent from the following detailed description and the accompanying drawings in which:

FIG. 12A is a simplified diagram in accordance with embodiments.

FIG. 12B is a simplified diagram in accordance with embodiments.

DETAILED DESCRIPTION

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

Figure 1:
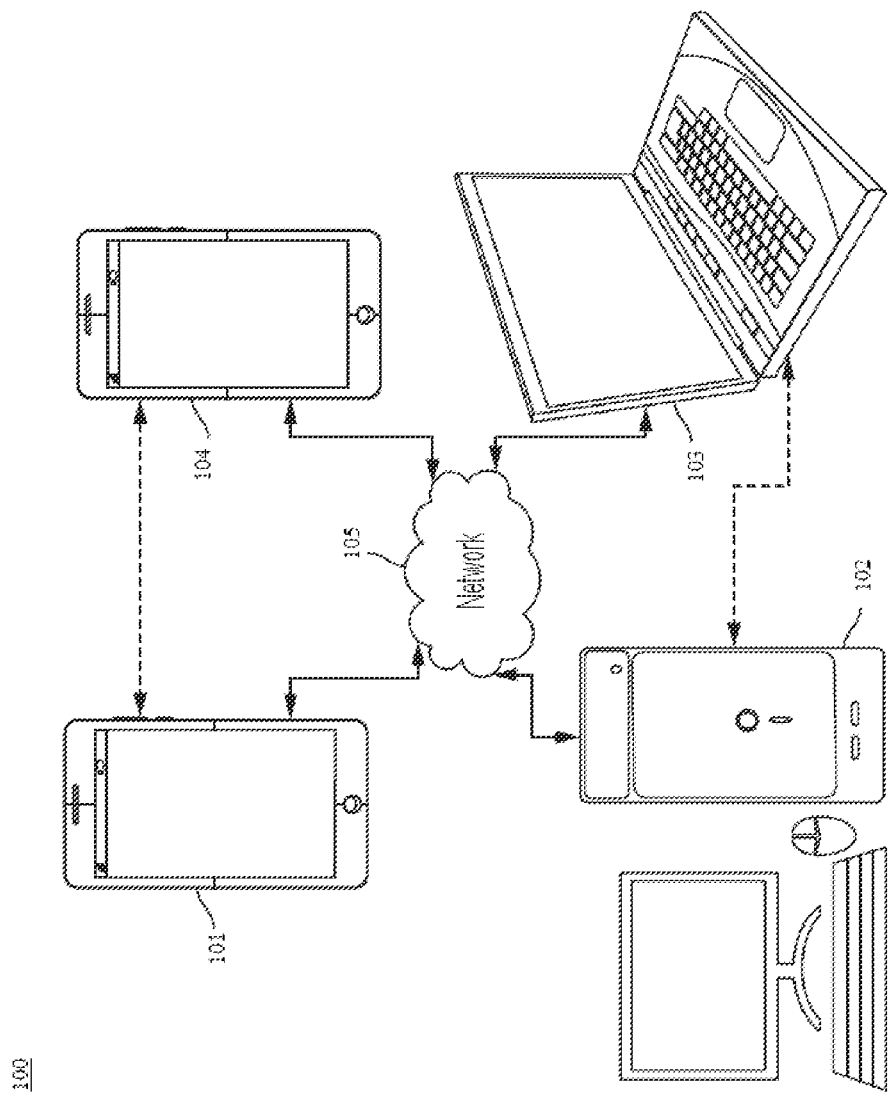
FIG. 1 is a simplified schematic illustration in accordance with embodiments.

FIG. 1 illustrates a simplified block diagram of a communication system 100 according to an embodiment of the present disclosure. The communication system 100 may include at least two terminals 102 and 103 interconnected via a network 105. For unidirectional transmission of data, a first terminal 103 may code video data at a local location for transmission to the other terminal 102 via the network 105. The second terminal 102 may receive the coded video data of the other terminal from the network 105, decode the coded data and display the recovered video data. Unidirectional data transmission may be common in media serving applications and the like.

FIG. 1 illustrates a second pair of terminals 101 and 104 provided to support bidirectional transmission of coded video that may occur, for example, during videoconferencing. For bidirectional transmission of data, each terminal 101 and 104 may code video data captured at a local location for transmission to the other terminal via the network 105. Each terminal 101 and 104 also may receive the coded video data transmitted by the other terminal, may decode the coded data and may display the recovered video data at a local display device.

In FIG. 1, the terminals 101, 102, 103 and 104 may be illustrated as servers, personal computers and smart phones but the principles of the present disclosure are not so limited. Embodiments of the present disclosure find application with laptop computers, tablet computers, media players and/or dedicated video conferencing equipment. The network 105 represents any number of networks that convey coded video data among the terminals 101, 102, 103 and 104, including for example wireline and/or wireless communication networks. The communication network 105 may exchange data in circuit-switched and/or packet-switched channels. Representative networks include telecommunications networks, local area networks, wide area networks and/or the Internet. For the purposes of the present discussion, the architecture and topology of the network 105 may be immaterial to the operation of the present disclosure unless explained herein below.

Figure 2:
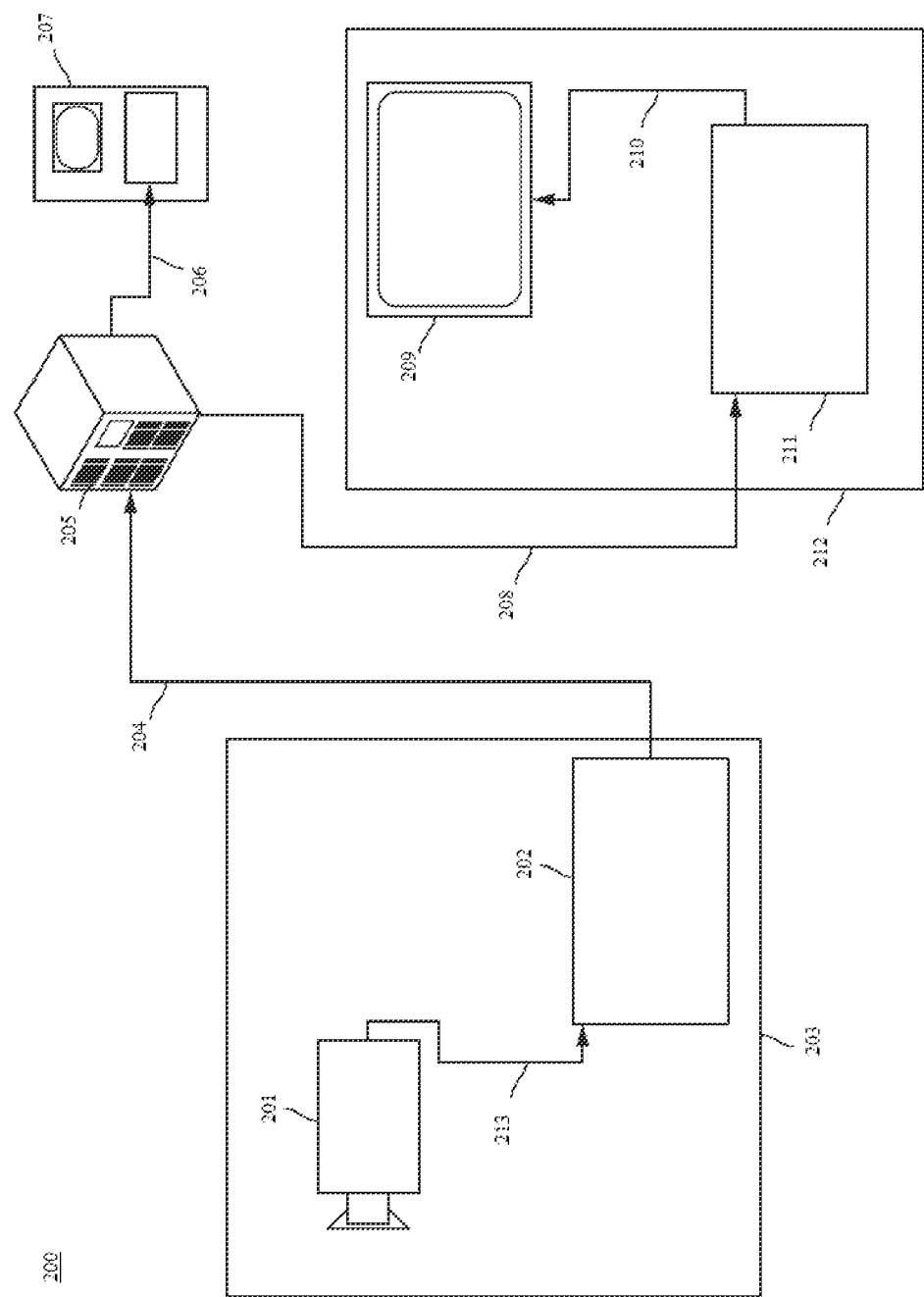
FIG. 2 is a simplified schematic illustration in accordance with embodiments.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem 203, that can include a video source 201, for example a digital camera, creating, for example, an uncompressed video sample stream 213. That sample stream 213 may be emphasized as a high data volume when compared to encoded video bitstreams and can be processed by an encoder 202 coupled to the camera 201. The encoder 202 can include hardware, software, or a combination thereof to enable or implement aspects of the disclosed subject matter as described in more detail below. The encoded video bitstream 204, which may be emphasized as a lower data volume when compared to the sample stream, can be stored on a streaming server 205 for future use. One or more streaming clients 212 and 207 can access the streaming server 205 to retrieve copies 208 and 206 of the encoded video bitstream 204. A client 212 can include a video decoder 211 which decodes the incoming copy of the encoded video bitstream 208 and creates an outgoing video sample stream 210 that can be rendered on a display 209 or other rendering device (not depicted). In some streaming systems, the video bitstreams 204, 206 and 208 can be encoded according to certain video coding/compression standards. Examples of those standards are noted above and described further herein.

Figure 3:
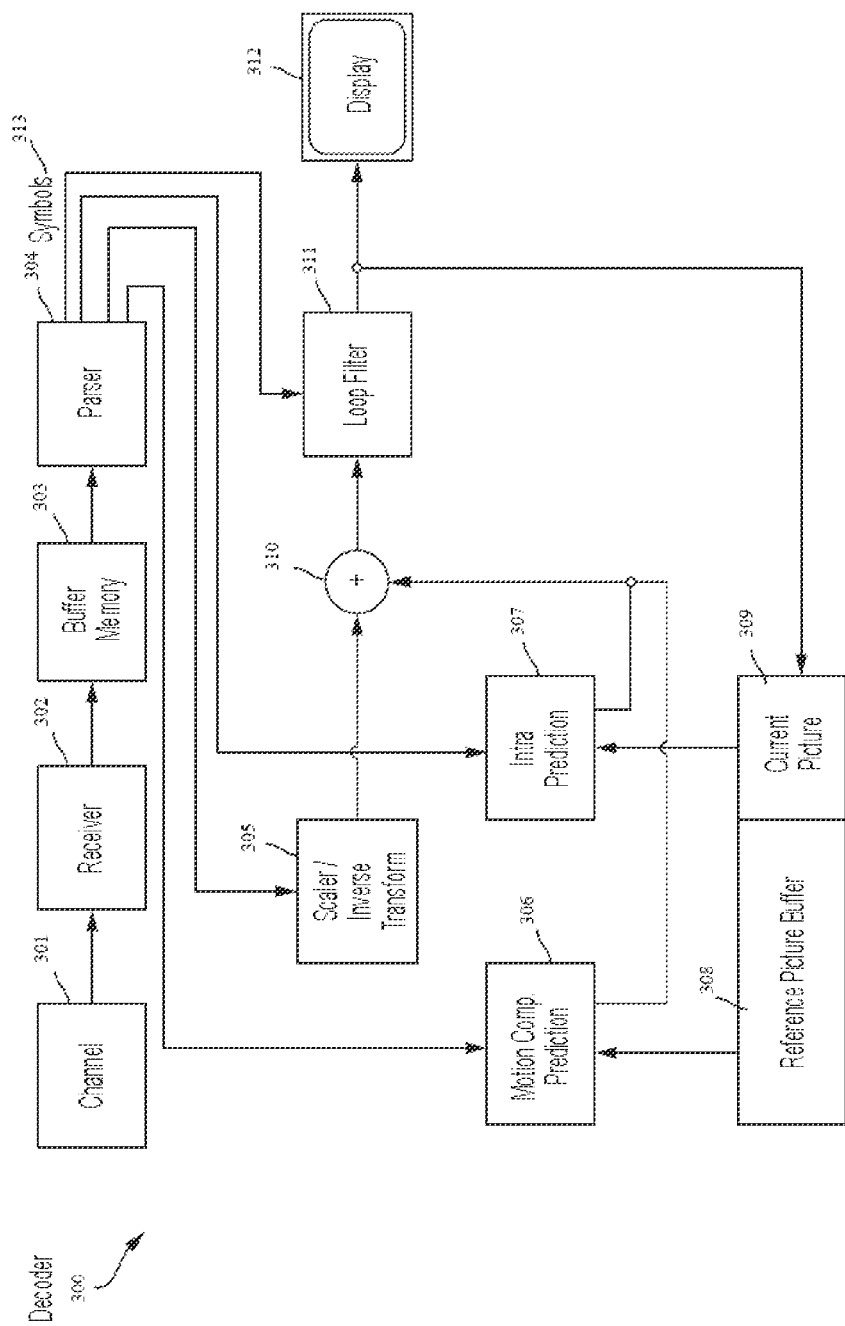
FIG. 3 is a simplified block diagram regarding decoders in accordance with embodiments.

FIG. 3 may be a functional block diagram of a video decoder 300 according to an embodiment of the present invention.

A receiver 302 may receive one or more codec video sequences to be decoded by the decoder 300; in the same or another embodiment, one coded video sequence at a time, where the decoding of each coded video sequence is independent from other coded video sequences. The coded video sequence may be received from a channel 301, which may be a hardware/software link to a storage device which stores the encoded video data. The receiver 302 may receive the encoded video data with other data, for example, coded audio data and/or ancillary data streams, that may be forwarded to their respective using entities (not depicted). The receiver 302 may separate the coded video sequence from the other data. To combat network jitter, a buffer memory 303 may be coupled in between receiver 302 and entropy decoder/parser 304 ("parser" henceforth). When receiver 302 is receiving data from a store/forward device of sufficient bandwidth and controllability, or from an isosychronous network, the buffer 303 may not be needed, or can be small. For use on best effort packet networks such as the Internet, the buffer 303 may be required, can be comparatively large and can advantageously of adaptive size.

The video decoder 300 may include a parser 304 to reconstruct symbols 313 from the entropy coded video sequence. Categories of those symbols include information used to manage operation of the decoder 300, and potentially information to control a rendering device such as a display 312 that is not an integral part of the decoder but can be coupled to it. The control information for the rendering device(s) may be in the form of Supplementary Enhancement Information (SEI messages) or Video Usability Information parameter set fragments (not depicted). The parser 304 may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser 304 may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter values, motion vectors, and so forth.

The parser 304 may perform entropy decoding/parsing operation on the video sequence received from the buffer 303, so to create symbols 313. The parser 304 may receive encoded data, and selectively decode particular symbols 313. Further, the parser 304 may determine whether the particular symbols 313 are to be provided to a Motion Compensation Prediction unit 306, a scaler/inverse transform unit 305, an Intra Prediction Unit 307, or a loop filter 311.

Reconstruction of the symbols 313 can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser 304. The flow of such subgroup control information between the parser 304 and the multiple units below is not depicted for clarity.

Beyond the functional blocks already mentioned, decoder 300 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit 305. The scaler/inverse transform unit 305 receives quantized transform coefficient as well as control information, including which transform to use, block size, quantization factor, quantization scaling matrices, etc. as symbol(s) 313 from the parser 304. It can output blocks comprising sample values, that can be input into aggregator 310.

In some cases, the output samples of the scaler/inverse transform 305 can pertain to an intra coded block; that is: a block that is not using predictive information from previously reconstructed pictures, but can use predictive information from previously reconstructed parts of the current picture. Such predictive information can be provided by an intra picture prediction unit 307. In some cases, the intra picture prediction unit 307 generates a block of the same size and shape of the block under reconstruction, using surrounding already reconstructed information fetched from the current (partly reconstructed) picture 309. The aggregator 310, in some cases, adds, on a per sample basis, the prediction information the intra prediction unit 307 has generated to the output sample information as provided by the scaler/inverse transform unit 305.

In other cases, the output samples of the scaler/inverse transform unit 305 can pertain to an inter coded, and potentially motion compensated block. In such a case, a Motion Compensation Prediction unit 306 can access reference picture memory 308 to fetch samples used for prediction. After motion compensating the fetched samples in accordance with the symbols 313 pertaining to the block, these samples can be added by the aggregator 310 to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols 313 that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator 310 can be subject to various loop filtering techniques in the loop filter unit 311. Video compression technologies can include in-loop filter technologies that are controlled by parameters included in the coded video bitstream and made available to the loop filter unit 311 as symbols 313 from the parser 304, but can also be responsive to meta-information obtained during the decoding of previous (in decoding order) parts of the coded picture or coded video sequence, as well as responsive to previously reconstructed and loop-filtered sample values.

The output of the loop filter unit 311 can be a sample stream that can be output to the render device 312 as well as stored in the reference picture memory 557 for use in future inter-picture prediction.

Certain coded pictures, once fully reconstructed, can be used as reference pictures for future prediction. Once a coded picture is fully reconstructed and the coded picture has been identified as a reference picture (by, for example, parser 304), the current reference picture 309 can become part of the reference picture buffer 308, and a fresh current picture memory can be reallocated before commencing the reconstruction of the following coded picture.

The video decoder 300 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver 302 may receive additional (redundant) data with the encoded video. The additional data may be included as part of the coded video sequence(s). The additional data may be used by the video decoder 300 to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 4:
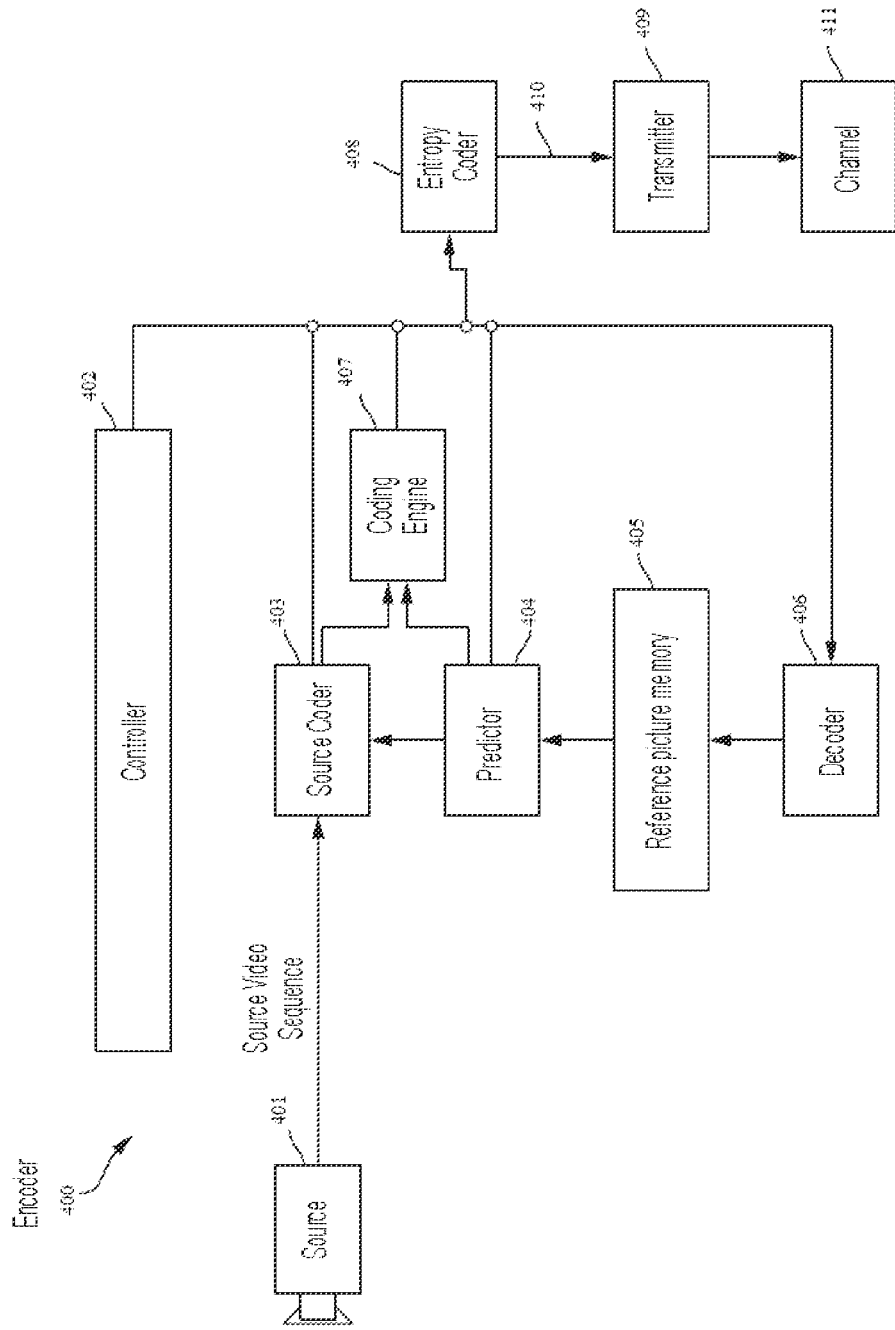
FIG. 4 is a simplified block diagram regarding encoders in accordance with embodiments.

FIG. 4 may be a functional block diagram of a video encoder 400 according to an embodiment of the present disclosure.

The encoder 400 may receive video samples from a video source 401 (that is not part of the encoder) that may capture video image(s) to be coded by the encoder 400.

The video source 401 may provide the source video sequence to be coded by the encoder (303) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source 401 may be a storage device storing previously prepared video. In a videoconferencing system, the video source 401 may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder 400 may code and compress the pictures of the source video sequence into a coded video sequence 410 in real time or under any other time constraints as required by the application. Enforcing appropriate coding speed is one function of Controller 402. Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller 402 as they may pertain to video encoder 400 optimized for a certain system design.

Some video encoders operate in what a person skilled in the art readily recognizes as a "coding loop." As an oversimplified description, a coding loop can consist of the encoding part of an encoder 402 ("source coder" henceforth) (responsible for creating symbols based on an input picture to be coded, and a reference picture(s)), and a (local) decoder 406 embedded in the encoder 400 that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory 405. As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder 406 can be the same as of a "remote" decoder 300, which has already been described in detail above in conjunction with FIG. 3. Briefly referring also to FIG. 4, however, as symbols are available and en/decoding of symbols to a coded video sequence by entropy coder 408 and parser 304 can be lossless, the entropy decoding parts of decoder 300, including channel 301, receiver 302, buffer 303, and parser 304 may not be fully implemented in local decoder 406.

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder 403 may perform motion compensated predictive coding, which codes an input frame predictively with reference to one or more previously-coded frames from the video sequence that were designated as "reference frames." In this manner, the coding engine 407 codes differences between pixel blocks of an input frame and pixel blocks of reference frame(s) that may be selected as prediction reference(s) to the input frame.

The local video decoder 406 may decode coded video data of frames that may be designated as reference frames, based on symbols created by the source coder 403. Operations of the coding engine 407 may advantageously be lossy processes. When the coded video data may be decoded at a video decoder (not shown in FIG. 4), the reconstructed video sequence typically may be a replica of the source video sequence with some errors. The local video decoder 406 replicates decoding processes that may be performed by the video decoder on reference frames and may cause reconstructed reference frames to be stored in the reference picture cache 405. In this manner, the encoder 400 may store copies of reconstructed reference frames locally that have common content as the reconstructed reference frames that will be obtained by a far-end video decoder (absent transmission errors).

The predictor 404 may perform prediction searches for the coding engine 407. That is, for a new frame to be coded, the predictor 404 may search the reference picture memory 405 for sample data (as candidate reference pixel blocks) or certain metadata such as reference picture motion vectors, block shapes, and so on, that may serve as an appropriate prediction reference for the new pictures. The predictor 404 may operate on a sample block-by-pixel block basis to find appropriate prediction references. In some cases, as determined by search results obtained by the predictor 404, an input picture may have prediction references drawn from multiple reference pictures stored in the reference picture memory 405.

The controller 402 may manage coding operations of the video coder 403, including, for example, setting of parameters and subgroup parameters used for encoding the video data.

Output of all aforementioned functional units may be subjected to entropy coding in the entropy coder 408. The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter 409 may buffer the coded video sequence(s) as created by the entropy coder 408 to prepare it for transmission via a communication channel 411, which may be a hardware/software link to a storage device which would store the encoded video data. The transmitter 409 may merge coded video data from the video coder 403 with other data to be transmitted, for example, coded audio data and/or ancillary data streams (sources not shown).

The controller 402 may manage operation of the encoder 400. During coding, the controller 405 may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder 400 may perform coding operations according to a predetermined video coding technology or standard, such as ITU-T Rec. H.265. In its operation, the video coder 400 may perform various compression operations, including predictive coding operations that exploit temporal and spatial redundancies in the input video sequence. The coded video data, therefore, may conform to a syntax specified by the video coding technology or standard being used.

In an embodiment, the transmitter 409 may transmit additional data with the encoded video. The source coder 403 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Figure 5:
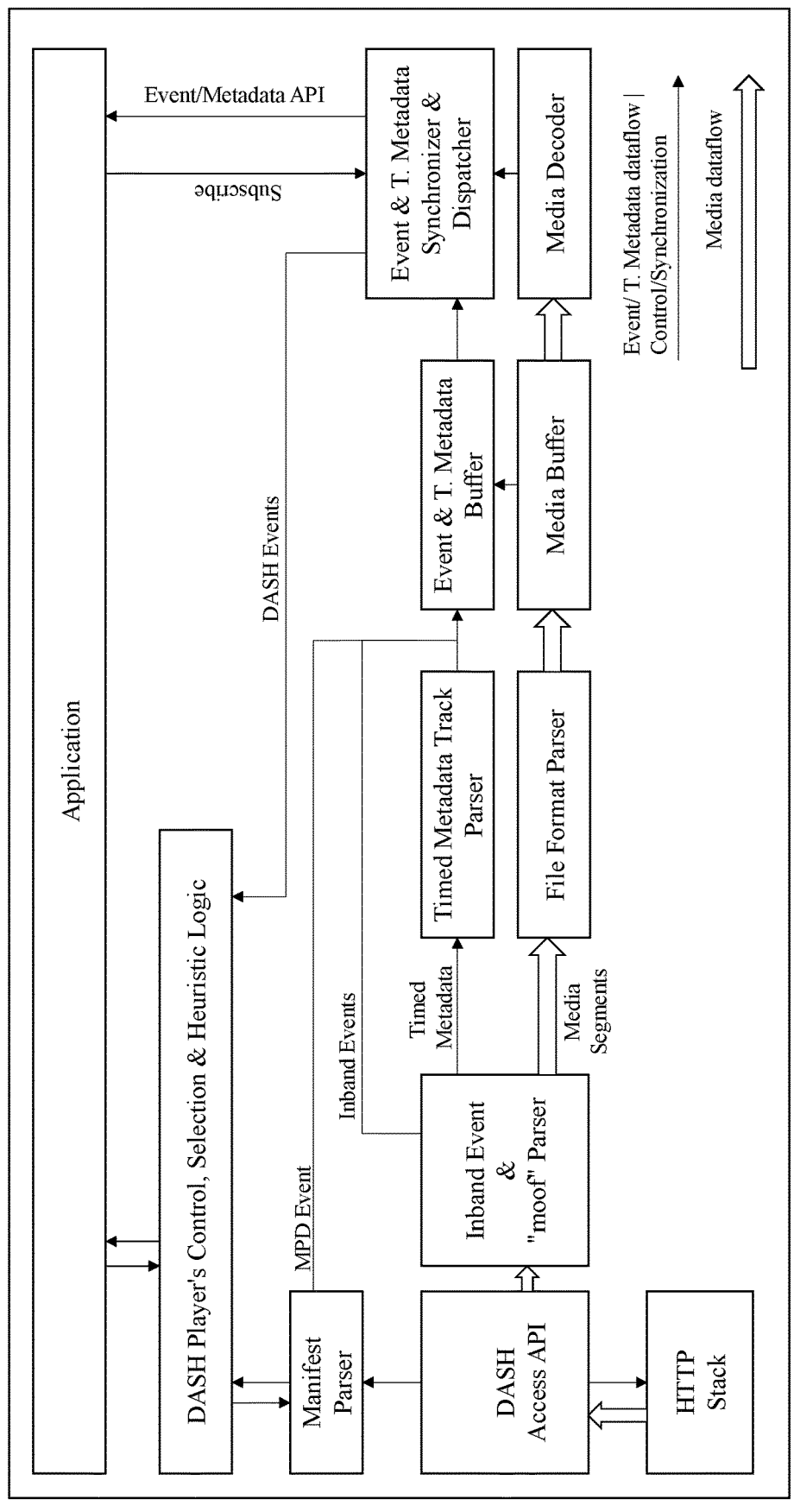
FIG. 5 is a simplified block diagram in accordance with embodiments.

FIG. 5 shows a sample DASH client processing model 500, such as of a client sample architecture for processing DASH and Common Media Application Format (CMAF) events, in which a client request of media segments may be based on described addresses in a manifest which also described metadata tracks from which a client may access segments of metadata tracks, parse them, and send them to an application. Further, according to exemplary embodiments, of addresses for media segments such as described below, a DASH manifest may provide addressed for Index segments. Each index segment may provide information about one segment duration and size, and a Representation Index may provide the index information for all segments of a given representation.

Figure 6:
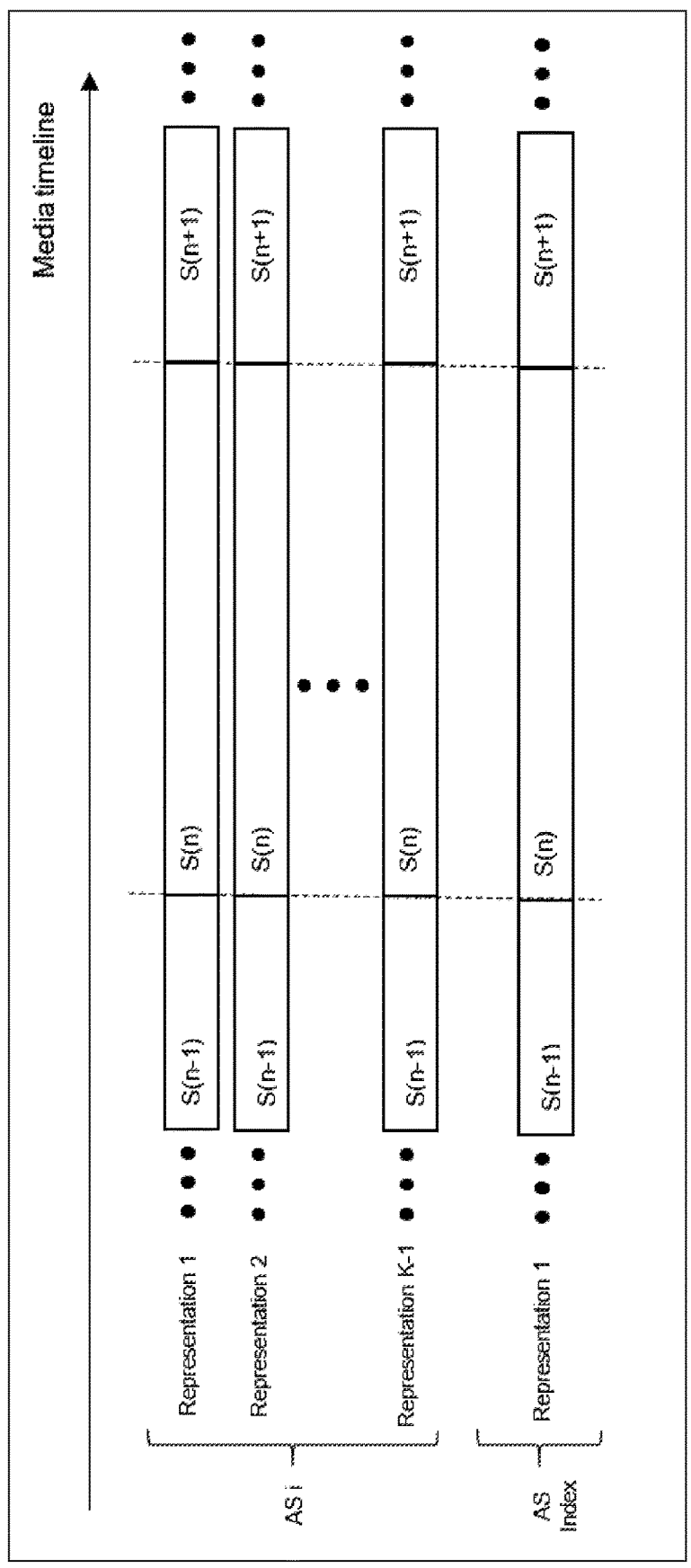
FIG. 6 is a simplified diagram in accordance with embodiments.

FIG. 6 shows an example 600 for a sample of a metadata track for adaptation set segment indexing such as for any given adaptation set. For example, for each adaptation set (AS) that the instantaneous segment bandwidth is expected to be signaled, a separate adaptation set may also be included in the manifest, as shown in FIG. 6.

As shown in FIG. 6, for an AS i with k media representation that their segments are timed aligned, a new adaptation set AS index is added to the manifest that contains a single representation. This single representation is a timed metadata track that its segments are also timed aligned with the segments of the AS i representations.

Figure 7:
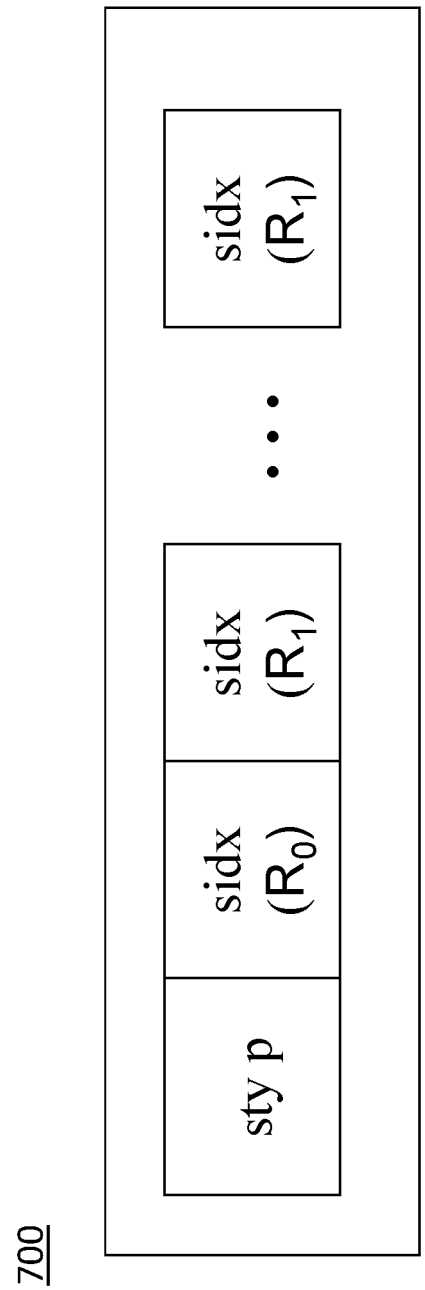
FIG. 7 is a simplified diagram in accordance with embodiments.

FIG. 7 shows a combo index segment example 700 according to exemplary embodiments in which each segment therein may have the following characteristics: (1) it shall start with an ISO Base Media File Format (as defined in ISO/IEC 14496-12) (ISOBMFF) "styp" box with the brand 'cisx' to identify this is a combination index segment box for all tracks, (2) it shall include k 'sidx' boxes, in order 0, 1, 2, . . . , K−1, each corresponding to one representation 0, 1, 2, . . . , K−1 of the referenced adaptation set respectively and in that order, and (3) each sidx box shall include the duration and size of the entire segment of the corresponding representation. According to exemplary embodiments, ISOBMFF segment formats for implementations that define the MIME-type parameters used to signal codecs, and provides the necessary format specific definitions for initialization segments, media segments, and random access points such as required by the byte stream formats section of the Media Source Extensions.

Figure 8:
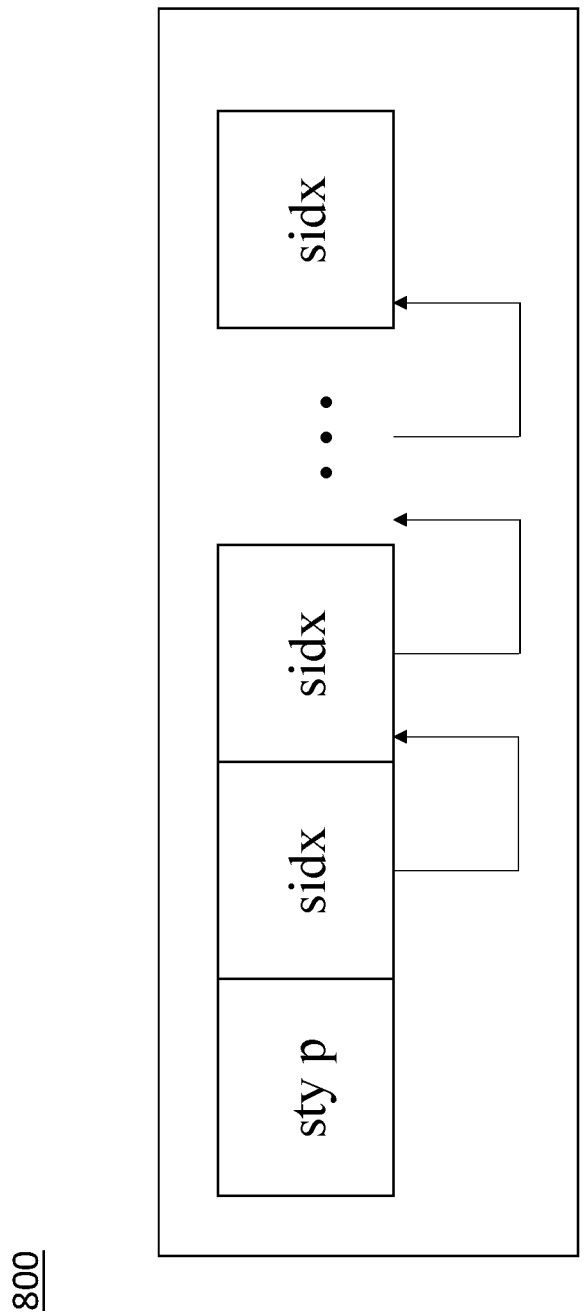
FIG. 8 is a simplified diagram in accordance with embodiments.

FIG. 8 shows a resync index segment example 800 such as for a low delay mode which introduces a resync index segment with a following structure: $R_0$ such that (1) it shall start with an ISOBMFF 'styp' box with the brand 'rpis', (2) it shall include a series of sidx boxes that are daisy-chained and graduated are added to the segment as each chunk encoding is completed, and (3) each sidx box shall include the duration, size, and starting stream access point (SAP)

type of one chunk of the corresponding media segment, in order of appearance in the media segment.

Figure 9:
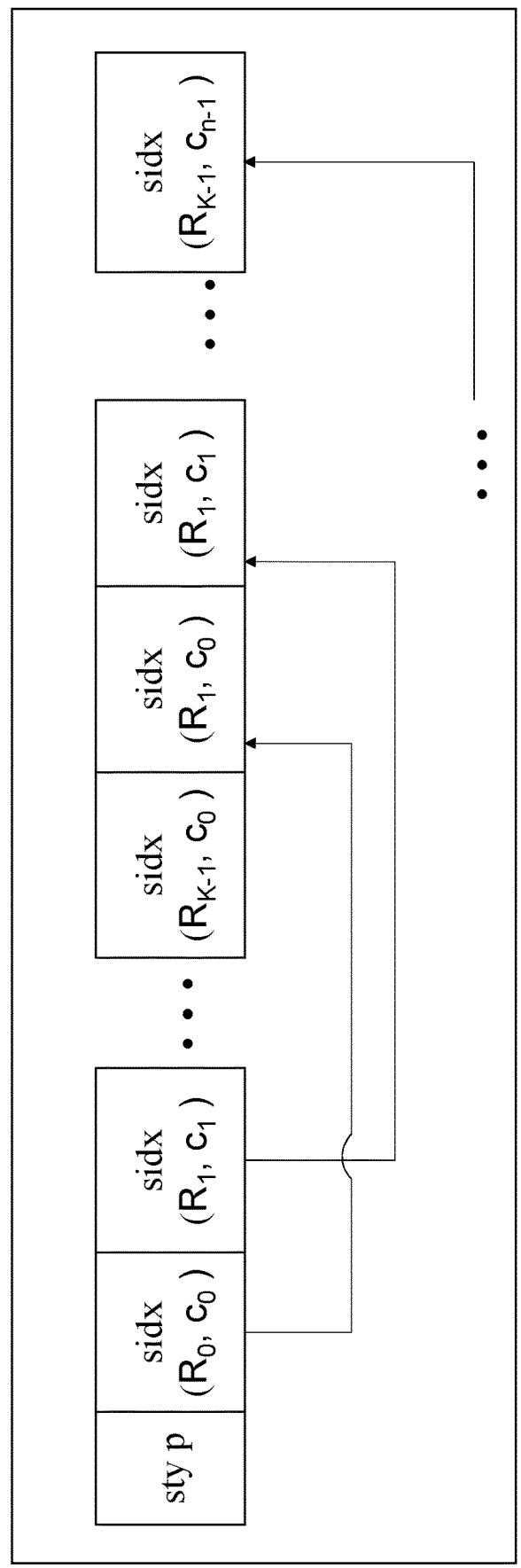
FIG. 9 is a simplified diagram in accordance with embodiments.

FIG. 9 shows a combo resync index segment example 900 such as for a low delay mode in which is introduced a combo-resync index segment with the following structure: (1) it shall start with an ISOBMFF 'styp' box with the brand 'rpis', (2) it shall include a series of sidx boxes in order 0, 1, 2, ..., K−1, each corresponding to one representation 0, 1, 2, ..., K−1 of the referenced adaptation set respectively and in that order (and according to exemplary embodiments, each sidx box has a fixed length since as version 0 one level sidx boxes with one reference count, and each box point to the next sidx box of the next chunks of the same representation that are ordered with the same order), and (3) each sidx box shall include the duration, size, and starting SAP type of one chunk of the corresponding media segment, in order of appearance in the media segment.

According to exemplary embodiments, a metadata track may be included in a separate adaptation in a manifest and this adaptation set must have the following constraints: (1) the same addressing scheme of the referenced media adaptation set shall be used for this representation (and if the representations of the referenced adaptation set have various addressing schemes, one of the representations addressing scheme shall be used for the metadata track representation), (2) a number of segments of a metadata track shall be equal to a highest number of segments of any representation in a referenced adaptation set, (3) an adaptation set of the metadata track shall be signaled as metadata in its MIME type and a specific identifier should be used for @codec to signal this combo-index segment track, (4) the representation track shall be signaled as metadata, as well as the index segment type, one of the following: combo index segment, combo reync index segment, combo index segment with last resync index segment, (5) the referenced adaptation set id shall be included in a supplemental descriptor's value field in the metadata track adaptation set, with a specific schemeIdUri such as uri:mpeg:dash:sidxtrack:2020, and (6) the metadata representation id shall be identical to the representation of the referenced adaptation set that their addressing schemes are identical.

Figure 10:
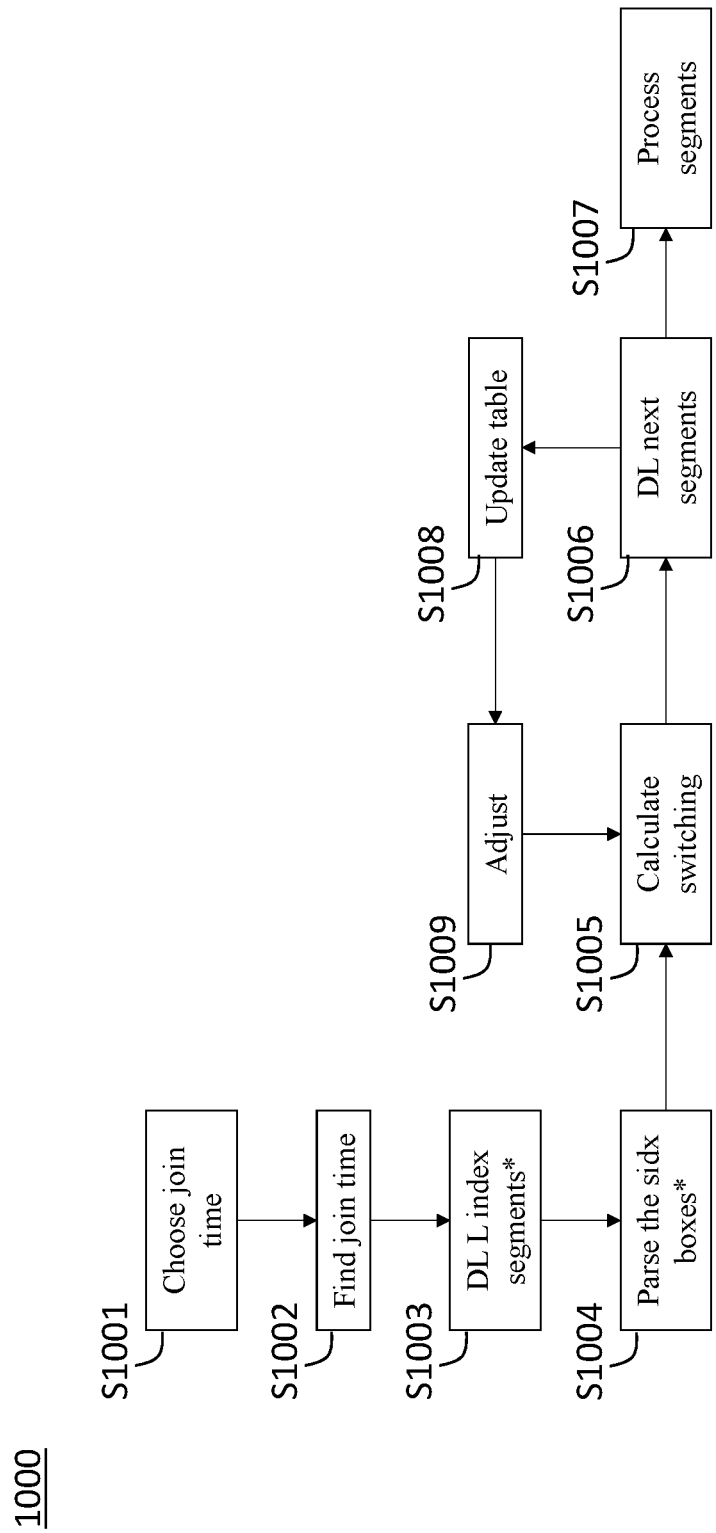
FIG. 10 is a simplified flowchart in accordance with embodiments.

FIG. 10 illustrates an exemplary flowchart 1000 with respect to a DASH client processing model with separate segment index per representation wherein according to exemplary embodiments it is possible to retrieve segment duration and sizes without combo index segment tracks, and if each representation also has an index segment, defined in the manifest, then DASH client processing model may be as the following: at S1001 there is a choice of the join time of the live stream with the following considerations: (J: The size of its input buffer based on the number of segments with average duration and possible bandwidth fluctuations; and L: the number of segments to allow look ahead in metadata track. L can be from 0 to any positive number. Note that the (L*average_duration) is added to the playback), at S1002 there is a finding of the join time of the live stream based on J and L, and S1003, there is a downloading of L index segments per representation, and therefore L*K downloads, at S1004 there is a parsing of the sidx boxes of L*K index segments and building a size/duration segment of Table 1 (below), and at S1005 there is, in view of Table 1, calculation of switching to the representation(s) that for the next M segments (M<L), the best quality is achieved while the input buffer does not overflow, at S1006 there is a downloading of a next media segment and the L+1 metadata segment (hereafter at S1007 there may be processing and playing thereon), at S1008 there is an updating accordingly to the Table 1, and at S1009 there is an adjusting of a decision considering a network bandwidth change(s), and then again to S1005 as shown in FIG. 10.

As is shown, the difference of using the combo-index segment track instead of the index segment of representation is that before each segment request, the DASH client requests K index segments. If K is a large number, then the additional number of requests may be inefficient.

TABLE 1

| | Cross-representation segment duration-size table | | | | | |
|---|---|---|---|---|---|---|
| Representation | Segment 0 Duration | Segment 0 Size | Segment 1 Duration | Segment 2 Size | Segment L − 1 ... Duration | Segment L − 1 Size |
| 0 | | | | | | |
| 1 | | | | | | |
| K − 1 | | | | | | |

Figure 11:
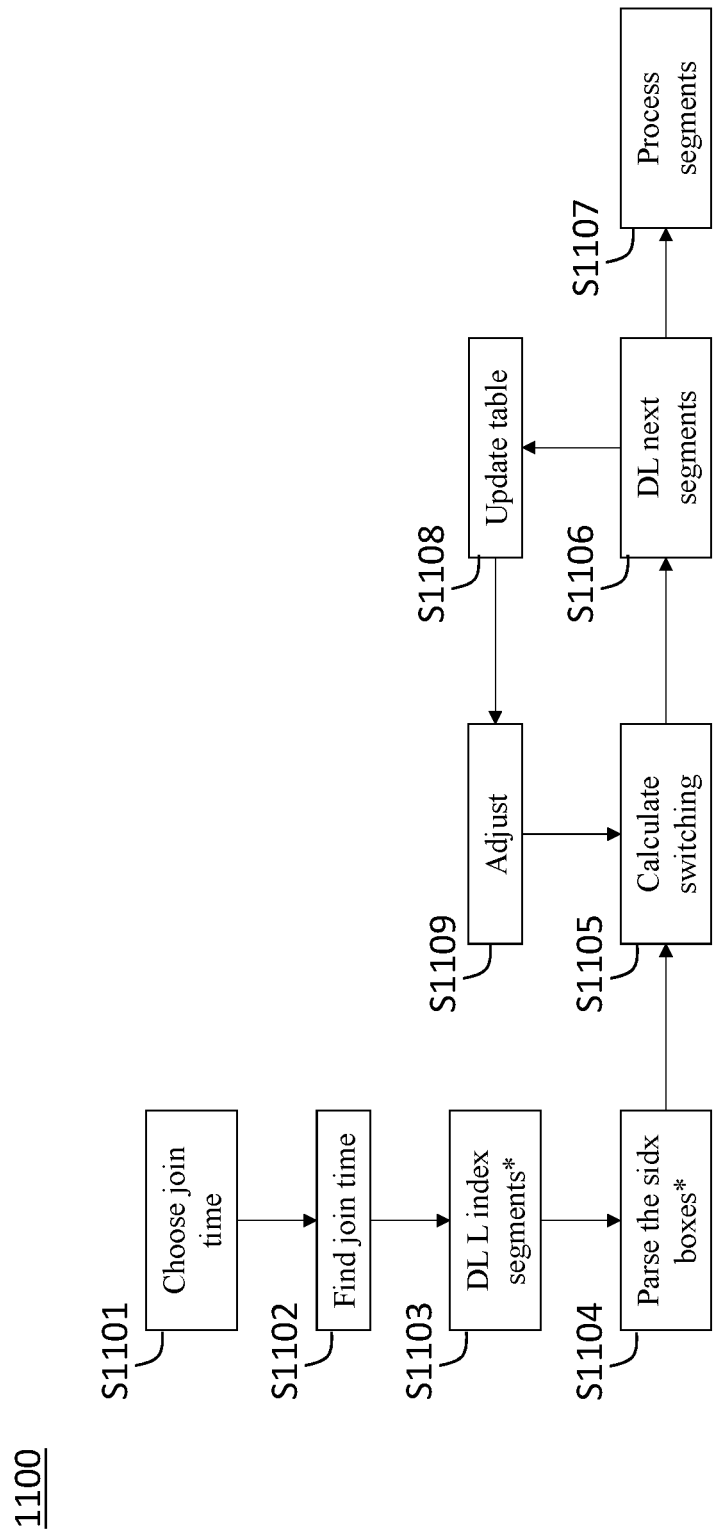
FIG. 11 is a simplified flowchart in accordance with embodiments.

FIG. 11 illustrates an exemplary flowchart 1100 with respect to a DASH client processing model with combo segment index track wherein according to exemplary embodiments: at S1001, there is a choosing of a join time of the live stream (with the following considerations: J: The size of its input buffer based on the number of segments with average duration and possible bandwidth fluctuations, and L: the number of segments to allow look ahead in metadata track. L can be from 0 to any positive number. Note that the (L*average_duration) is added to the playback.), at S1102 there is a finding of a join time of the live stream based on J and L, at S1103, there is a download (DL) of L segments from the combo-index segment track from the live edge, at S1104 there is a parsing of the sidx boxes of L segments and build a size/duration segment of Table 1, at S1105 there is, in view of Table 1, a calculation of switching to the representation(s) that for the next M segments (M<L), the best quality is achieved while the input buffer doesn't overflow, at S1106 there is a download (DL) of a next media segment and a L+1 metadata segment (hereafter at S1107 there may be processing and playing thereon), at S1108 there is an updating accordingly to the Table 1, and at S1109 there is an adjusting of a decision considering a network bandwidth change(s), and then again to S1105 as shown in FIG. 11.

As is shown, the DASH client may make one combo index segment request per media segment request, compared to the K index segment request from data of FIG. 6. Therefore especially for large K, such exemplary embodiments are very efficient.

Further according to exemplary embodiments with respect to DASH client processing model in low delay for example, there may be a metadata track that may also be used with instantaneous chunk bandwidth adaptation in the low delay case and as in such case, a metadata sample may include the index segments and resync index segments of all representations. Considering such embodiments, two possible variations may be considered: (a) Mixed combo index track: A single metadata track that each segment includes the sidx boxes of the corresponding segment but the last segment (the segment at the live edge) such that a last segment may be a combo resync index segment that is gradually being appended and when the corresponding media segment is completed, the combo-resync segment is replaced with the combo-index segment, and (b) Regular and Low delay combo tracks: An adaptation sets of two metadata tracks, one track with combo index segments, and one with combo resync index segments.

For a client operating in low delay mode, embodiments may stream segments from the low delay combo track while other client stream segments from the regular combo track. Alternatively, if only a mixed combo index track is provided, both regular and low delay clients may stream from a same track.

According to exemplary embodiments, the combo-index track is an ISOBMFF timed metadata track with the following structures. The header includes the following information: (1) a track 4CC identifier, (2) number of tracks in the switching set, (3) the track identifiers of the switching set's tracks, (4) optionally a quality metric identifier that the quality of tracks, segments, and chunks are measured with, and (5) the quality of each track is compared to the other tracks using the above quality metric. The metadata segments have the following characteristics: (1) all segments are timed aligned with the corresponding switching set's segments, (2) all chunks are timed aligned with the corresponding switching set's chunks, and (3) all segments have a 4CC identifier in their brand. Each metadata sample has the following characteristics: (1) each sample in the time metadata track is a random access sample, and (2) each sample has the following information: (a) the SAP type of the corresponding media segments/chunks, (b) indicate is the media segments/chunk have top-level boxes such as event and prft boxes, (c) a time scale for measuring the duration of segments and chunks, (d) a flag if the duration is known, (e) a flag if the duration is exact, (f) a maximum duration variation in the percentage of the duration, (g) the duration of the corresponding media segments/chunks in timescale defined in the metadata track header, (h) the size of each corresponding segment/chunk of each track in a specific order defined in this track, and (e) optionally the quality of the corresponding segment/chunk of a track compared to the other segments/chunk.

According to exemplary embodiments, the combo-index track is included in a separate adaptation in the manifest, and this combo-index adaptation set must have the following constraints: (1) the same addressing scheme of the referenced media adaptation set shall be used for this representation (if the representations of the referenced adaptation set have various addressing schemes, one of the representations addressing scheme shall be used for the metadata track representation), (2) the number of chunks/segments of the combo-index track shall be equal the number of chunks/segments of any representation in the referenced adaptation set, (3) the adaptation set of the metadata track shall be signaled as a combo-index track in its MIME type and a specific identifier should be used for @codec to signal this combo-index segment track, (4) the representation track shall be signaled as metadata, as well as the combo-index track, (5) the referenced adaptation set id shall be included in a supplemental descriptor's value field in the combo-index adaptation set, with a specific schemeIdUri such as uri:mpeg:dash:comboindex:2020, and (6) the metadata representation id shall be identical to the representation of the referenced adaptation set that their addressing schemes are identical.

FIG. 12A illustrates a sample entry 1200, representing a possible implementation of manifest constraints, that may be defined as shown in FIG. 12, and such samples may have a syntax such as syntax 1300 shown in FIG. 12B and may have the following semantics: "num_tracks" the number of tracks in the switching set; "track_id" provides the ordering of the track ids in the samples; "quality_indicator_flag" identifies if a specific quality indicator is used for identifying the quality of the chunk; "quality_identifier" a URI to indicate the quality metric in which the quality of tracks and sample are expected to be interpreted; "segment_start_flag" identifies if this chunk is identical with the start of a segment, i.e. if the chunk is the start of a segment; "SAP_type" identifies the SAP type. If 0, then the chunk doesn't start with an SAP; a marker identifies if this chunk includes a marker including the styp; "emsg_flag" identifies if this chunk includes any emsg boxes; "prft_flag" identifies if this chunk includes prft boxes; "known_duration_flag" identifies if the duration of this chunk is known. If this flag is 'false', then the flags exact_duration_flag, and values of duration_variation, duration, and timescale fields shall be ignored; "exact_duration_flag" identifies if the value of the duration is accurate, i.e duration is not a nominal duration of this chunk (if this flag is 'true', the value of duration_variation field shall be ignored); "duration_variation" identifies the maximum variation of duration (shorter or longer variation) in percentage (this value should not be more than 100. A value more than 100 is processed as the value of 100); "duration" duration of the chunk in the timescale scale, i.e. the division of duration to timescale provides the duration of the chunk in seconds; "timescale" provides the timescale, in ticks per second, for the duration field within this box; it is recommended that this match the timescale of one track in the referenced switching set, first_offset identifies the offset of the chunk from the start of the sequence; "offset" identifies the byte offset of chunk from the segment start; size provides the size in octets of the chunk; "quality" provides the quality of the chunk according to quality scheme (if quality scheme is absent, then quality is interpreted linearly with quality increase with increasing value); "missing" identifies that the chunk is missing and should not be requested.

According to exemplary embodiments, the combo-index segments may be created by encoder(s), such as described above, along with encoding of the media, and in such case, since the encoder(s) may have an exact duration of each segment/chunk, this value can be included in metadata samples. However, the packager may also create this combo-index track based on the received segments from the encoder. In such case, depending on a capability of the packager, any of the following scenarios may be deployed: (a) the exact duration of each segment/chunk is known, and therefore the packager inserts the exact duration in the comb-index metadata sample, (b) the exact duration is not known, and therefore the packager only calculates the size of segments/chunks and includes them in the metadata sample and sets the flag that duration is unknown, (c) the exact duration is not known but a nominal duration and possibly the maximum range of duration variation is known to the packager, and therefore the packagers include these values in the metadata sample.

As such, according to exemplary embodiments, there is a method for bandwidth cap signaling to DASH client, using the index segments, and in low latency case, with resync index segments. To improve the performance, there is also introduced a combined index track in live streaming, and a DASH client may use any of the above means to find the instantaneous segment bandwidth and switch to the best representation that provides the best quality while it doesn't overflow its input buffer. There is also provided a signaling of the various track instantaneous bandwidth changes to a streaming client, such that the client can observe the sudden changes of the bandwidth requirements for all tracks at the same time and takes measures to switch another track if necessary depending on various criteria described above. Accordingly, embodiments herein improve the metadata track of MPEG DASH for instantaneous bandwidth change signaling to DASH client, using a metadata track that contains a combined segment and chunk duration and sizes of all tracks in the same adaptation set/switching set, and a DASH client may use any of the above means to find the instantaneous segment bandwidth and switch to the best representation that provides the best quality without an overflow to its input buffer.

For example, there may be any of creating a metadata track for providing instantaneous segment bandwidth information, wherein the information of all aligned segments of one media adaptation set is provided in a single segment of the metadata track; creating a combinational index segment, wherein all index information of all representations aligned segments are combined in one index segment; creating resync index segment for signaling the characteristics of chunks of one segment as a segment index, wherein the resync segment may be generated gradually along with the media chunks and can be delivered gradually to the client, therefore the client can use it for switching at chunk boundaries in low delay streaming; creating combo-resync index segments wherein the chuck resync information of all aligned segments of all representations of one adaptation set is included in the index segment, and gradually transmitted to the client, so that client may switch between chunks at low delay streaming; creating mixed combo index tracks that use combo index segment format for all segment but the last one that is being encoded, and the combo resync segment format for the segment that currently is being encoded; creating two parallel metadata tracks on for regular streaming operation consisting of combo index segments and the other track consisting of the combo resync index segments; methods by which the DASH client can use the information in segment index of all representation for monitoring the instantaneous bandwidth of each representation and use it for switching between representation considering bitrate peaks and valleys, and optimizing the representation adaptive selection based on the current bandwidth, buffer fullness as well as the segment size cross multiple representations; further using the above for the client to measure the instantaneous bandwidth of all representations more efficiently; further using the above for low delay operation thereof, enabling DASH clients to operate in low delay mode; and further using the above for enabling both regular and low delay clients to operate with one track or two tracks.

Further, there may also be creating a timed metadata track for providing instantaneous segment bandwidth and quality information, wherein the information of all aligned segments of one media adaptation set is provided in a single segment of the metadata track, wherein the duration and size information of all corresponding segment and/or chunks are included in a sample; creating resync chuck indexes for signaling the characteristics of chunks of one segment in the metadata sample along with the size of the chunk, wherein the metadata sample may be generated gradually along with the media chunks and can be delivered gradually to the client, therefore the client can use it for switching at chunk boundaries in low delay streaming; using of a relative quality of segments and/or chunks in methods above respectively, so that the client can compare the instantaneous quality cross all media tracks; signaling whether the duration of the aligned segment or the aligned chunks is known per each set of aligned segments or chunks, signal the nominal or exact duration if it is known, signal whether the signaled duration is exact or nominal, and if it is nominal, signal the maximum variation of duration; creating index segments to be created gradually and gradually transmitted to the client, so that client may switch between chunks at low delay streaming; creating a metadata track wherein all segments except the last one is as one of the above, while the last segment corresponds to the segment that being encoded at the live edge and created using other features above; creating two parallel metadata tracks, one using the features above and one using other features above, and signal these tracks in the manifest; having a DASH client use the information in metadata track segments above for monitoring the instantaneous bandwidth of each representation and use it for switching between representation considering bitrate peaks and valleys, and optimizing the representation adaptive selection based on the current bandwidth, buffer fullness as well as the segment size cross multiple representations; measuring the instantaneous bandwidth of all representations more efficiently; for low delay operation for the client to measure the instantaneous bandwidth of all representations more efficiently; and enabling both regular and low delay clients to operate with one track or two tracks.

Figure 13:
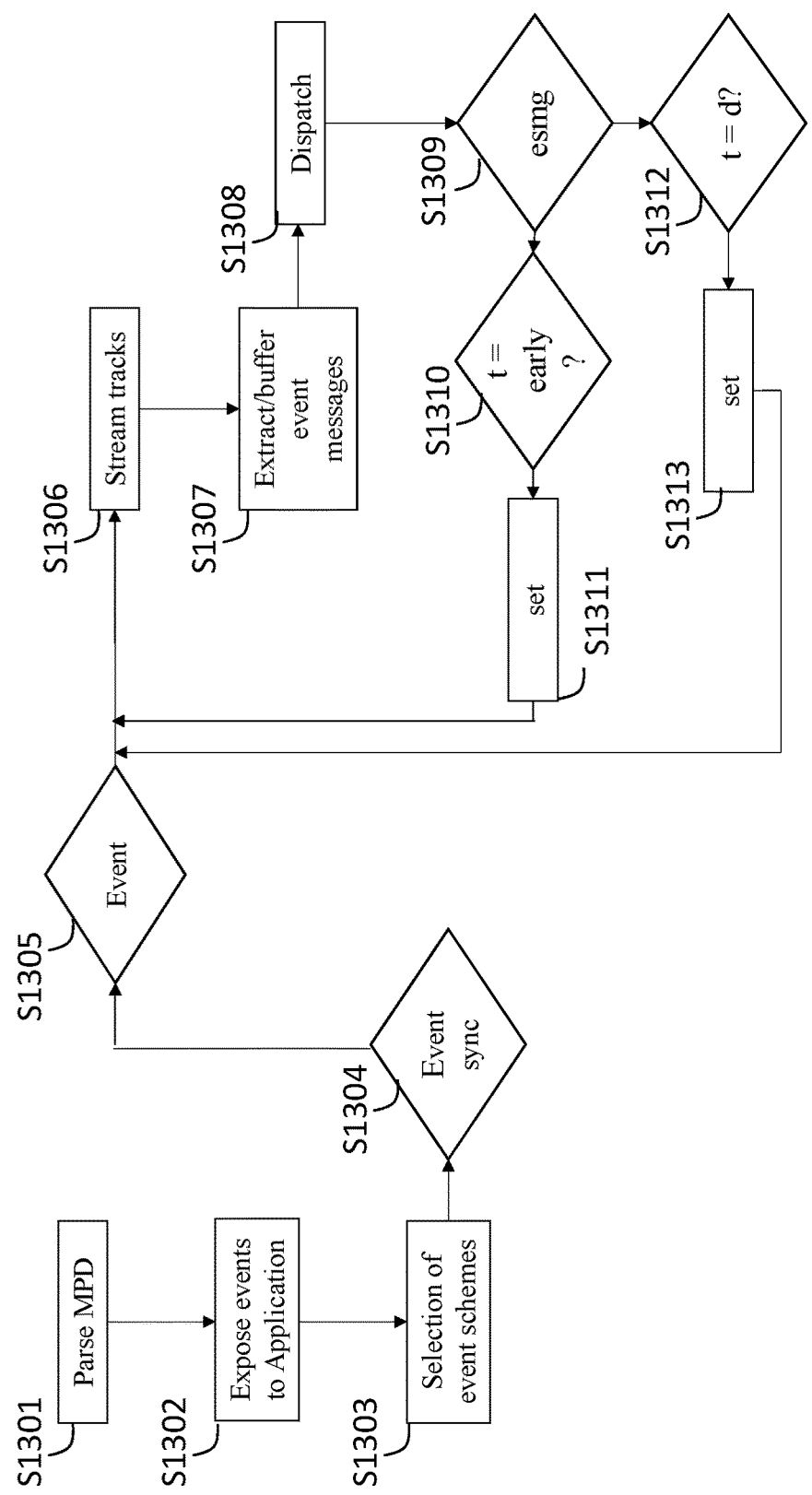
FIG. 13 is a simplified diagram in accordance with embodiments.

Viewing again the exemplary model 500 in FIG. 5 and the exemplary and simplified flowchart 1300 of FIG. 13, in embodiments, the MPD may be parsed first at S1301, and information about MPD events, inband events, and the events embedded in sparse timed metadata tracks are exposed to the application at S1302, as as in the model 500 in FIG. 5.

According to exemplary embodiments, such application at S1302 may have all or at least multiple of event scheme(s) information and may make a selection of event schemes at S1303 such as to subscribe to an interested scheme along with a desired dispatch mode for each scheme through the subscription APIs for example. According to embodiments, if event scheme(s), such as at S1304 and or S1305, are subscribed that are delivered as part of one or more sparse timed metadata track, the DASH client may determine to stream (at S1306) those tracks, to pass such information through a DASH client timed metadata track processing, to extract the event messages embedded in the tracks, and to put them into a buffer (at S1307), such as an event buffer; additionally, a synchronizer and dispatcher module of the DASH client may dispatch the subscribed events as part of all subscribed events consequently. For example, at S1304, a DASH client may also subscribe to the Event synchronizer and dispatcher; however, the event processing pipeline needs to process the DASH MPD events differently than the application events according to exemplary embodiment which improve over this technical problem as described herein.

For example, according to exemplary embodiments, there is defined the following exception in an event processing model for MPD validity expiration events: At S1308, event instances of an event stream are dispatched with an 'on-receive' mode, and at S1309, it is determined whether events of this scheme may use esmg v0 or emsg v1 such at, if it is determined that esmg v0 is used, then at S1310, it may be determined if presentation_time_delta=event duration=0, then at S1311 any of (i)-(iii), where (i) the presentation_time of the event shall be set to 0, (ii) the message_data is set to a specific message such as "//DashMediaPresentationIsEnded//" and (iii) both (i) and (ii), and at S1312 when it is determined that esmg v1 is used, then at S1312, it may also be determined if presentation_time=the earliest presentation time of the segment and event_duration=0, and if so, then at S1313 then any of (iv)-(vi) where (iv) the presentation_time of the event shall be set to 0, (v) the message_data is set to a specific message such as "//DashMediaPresentationIsEnded//" and (vi) both (iv) and (v).

Accordingly, such features represent a technical advantage over such problems described above whereby there is at least a method for processing MPD validity expiration events with the same application events processing pipeline of the DASH client, where in the event instances are dispatched in 'on-receive' mode, wherein few exceptions is added during the parsing the event, including when the presentation_time_delta and event_duration are zero or when the event presentation_time is equal to the segment earliest presentation time and event duration is zero wherein the value of presentation_time and/or the payload of message_data is changed such that the DASH client can recognize these special cases.

The techniques described above, can be implemented as computer software using computer-readable instructions and physically stored in one or more computer-readable media or by a specifically configured one or more hardware processors. For example, FIG. 14 shows a computer system 1400 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 14:
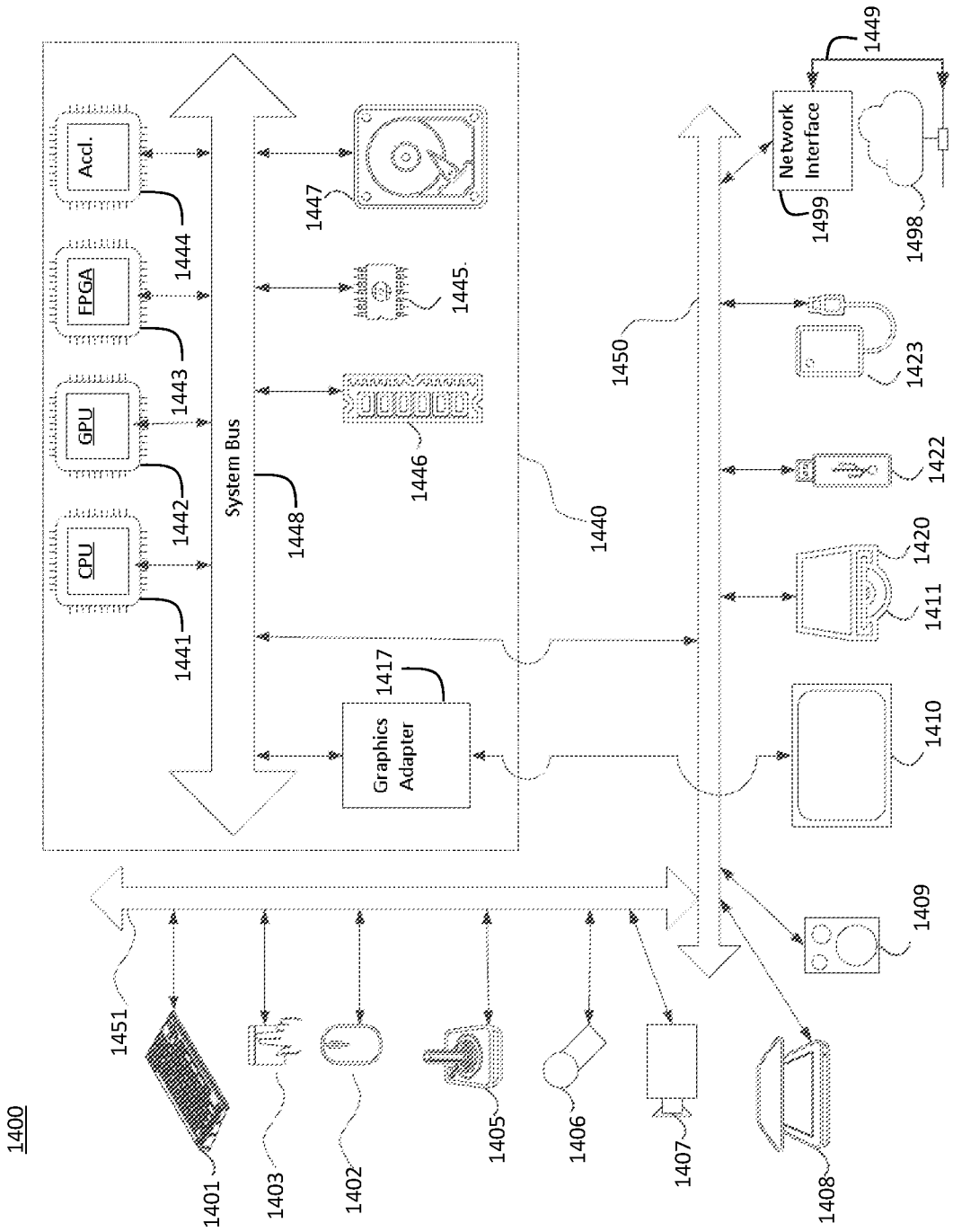
FIG. 14 is a schematic illustration in accordance with embodiments.

The components shown in FIG. 14 for computer system 1400 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 1400.

Computer system 1400 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1401, mouse 1402, trackpad 1403, touch screen 1410, joystick 1405, microphone 1406, scanner 1408, camera 1407.

Computer system 1400 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1410, or joystick 1405, but there can also be tactile feedback devices that do not serve as input devices), audio output devices (such as: speakers 1409, headphones (not depicted)), visual output devices (such as screens 1410 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 1400 can also include human accessible storage devices and their associated media such as optical media including CD/DVD ROM/RW 1420 with CD/DVD 1411 or the like media, thumb-drive 1422, removable hard drive or solid state drive 1423, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1400 can also include interface 1499 to one or more communication networks 1498. Networks 1498 can for example be wireless, wireline, optical. Networks 1498 can further be local, wide-area, metropolitan, vehicular and industrial, real-time, delay-tolerant, and so on. Examples of networks 1498 include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks 1498 commonly require external network interface adapters that attached to certain general-purpose data ports or peripheral buses (1450 and 1451) (such as, for example USB ports of the computer system 1400; others are commonly integrated into the core of the computer system 1400 by attachment to a system bus as described below (for example Ethernet interface into a PC computer system or cellular network interface into a smartphone computer system). Using any of these networks 1498, computer system 1400 can communicate with other entities. Such communication can be uni-directional, receive only (for example, broadcast TV), uni-directional send-only (for example CANbusto certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 1440 of the computer system 1400.

The core 1440 can include one or more Central Processing Units (CPU) 1441, Graphics Processing Units (GPU) 1442, a graphics adapter 1417, specialized programmable processing units in the form of Field Programmable Gate Areas (FPGA) 1443, hardware accelerators for certain tasks 1444, and so forth. These devices, along with Read-only memory (ROM) 1445, Random-access memory 1446, internal mass storage such as internal non-user accessible hard drives, SSDs, and the like 1447, may be connected through a system bus 1448. In some computer systems, the system bus 1448 can be accessible in the form of one or more physical plugs to enable extensions by additional CPUs, GPU, and the like. The peripheral devices can be attached either directly to the core's system bus 1448, or through a peripheral bus 1451. Architectures for a peripheral bus include PCI, USB, and the like.

CPUs 1441, GPUs 1442, FPGAs 1443, and accelerators 1444 can execute certain instructions that, in combination, can make up the aforementioned computer code. That computer code can be stored in ROM 1445 or RAM 1446. Transitional data can be also be stored in RAM 1446, whereas permanent data can be stored for example, in the internal mass storage 1447. Fast storage and retrieval to any of the memory devices can be enabled through the use of cache memory, that can be closely associated with one or more CPU 1441, GPU 1442, mass storage 1447, ROM 1445, RAM 1446, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 1400, and specifically the core 1440 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 1440 that are of non-transitory nature, such as core-internal mass storage 1447 or ROM 1445. The software implementing various embodiments of the present disclosure can be stored in such devices and executed by core 1440. A computer-readable medium can include one or more memory devices or chips, according to particular needs. The software can cause the core 1440 and specifically the processors therein (including CPU, GPU, FPGA, and the like) to execute particular processes or particular parts of particular processes described herein, including defining data structures stored in RAM 1446 and modifying such data structures according to the processes defined by the software. In addition or as an alternative, the computer system can provide functionality as a result of logic hardwired or otherwise embodied in a circuit (for example: accelerator 1444), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method of video coding, the method comprising:
    obtaining video data;
    creating, based on the video data, a timed metadata track indicating a segment bandwidth and comprising information of a plurality of aligned segments of a media adaptation set such that duration information and size information of each of the aligned segments are all included in at least one metadata sample which is of a single segment of the aligned segments, and wherein metadata samples of other ones of the aligned segments do not include the duration information and the size information of said each of the aligned segments but include individual ones of duration information and size information respective to ones of the other ones of the aligned segments;
    switching to one of a plurality of representations of the video data based on whether the timed metadata track indicates at least an overflow to an input buffer per each of the plurality of representations; and
    delivering the one of the plurality of representations to a client as a part of an event stream and based on at least one mode indicated in the event stream.

2. The method according to claim 1, further comprising:
    determining whether the at least one mode is an on-receive mode.

3. The method according to claim 2, further comprising:
    determining, in a case where it is determined that the at least one mode is the on-receive mode, whether event message (emsg) information of the event stream indicate one or more of a first version emsg and a second version emsg.

4. The method according to claim 3, further comprising:
    setting, in a case that the first version emsg is determined, presentation time information of an event of the event stream to zero in response to determining that at least one of a presentation time field and an event duration field of the event stream are zero.

5. The method according to claim 3, further comprising:
    setting, in a case that the first version emsg is determined, message data of an event of the event stream to a predetermined message in response to determining that at least one of a presentation time field and an event duration field of the event stream are zero.

6. The method according to claim 3, further comprising:
    setting, in a case that the first version emsg is determined, both presentation time information of an event of the event stream to zero and message data of an event of the event stream to a predetermined message in response to determining that at least one of a presentation time field and an event duration field of the event stream are zero.

7. The method according to claim 3, further comprising:
    setting, in a case that the second version emsg is determined, presentation time information of an event of the event stream to zero in response to determining both that a presentation time field is equal to another presentation time and also that an event duration field is equal to zero.

8. The method according to claim 3, further comprising:
    setting, in a case that the second version emsg is determined, message data of an event of the event stream to a predetermined message in response to determining both that a presentation time field is equal to another presentation time and also that an event duration field is equal to zero.

9. The method according to claim 3, further comprising:
    setting, in a case that the second version emsg is determined, both presentation time information of an event of the event stream to zero and also message data of an event of the event stream to a predetermined message in response to determining both that a presentation time field is equal to another presentation time and also that an event duration field is equal to zero.

10. The method according to claim 3, further comprising:
  setting, in a case that the first version emsg is determined, both presentation time information of an event of the event stream to zero and message data of an event of the event stream to a predetermined message in response to determining that at least one of a presentation time field and an event duration field of the event stream are zero; and
  setting, in a case that the second version emsg is determined, both presentation time information of an event of the event stream to zero and also message data of an event of the event stream to a predetermined message in response to determining both that a presentation time field is equal to another presentation time and also that an event duration field is equal to zero.

11. A apparatus for video streaming, the apparatus comprising:
  at least one memory configured to store computer program code;
  at least one processor configured to access the computer program code and operate as instructed by the computer program code, the computer program code including:
    obtaining code configured to cause the at least one processor to obtain video data;
    creating code configured to cause the at least one processor to create, based on the video data, a timed metadata track indicating a segment bandwidth and comprising information of a plurality of aligned segments of a media adaptation set such that duration information and size information of each of the aligned segments are all included in at least one metadata sample which is of a single segment of the aligned segments, and wherein metadata samples of other ones of the aligned segments do not include the duration information and the size information of said each of the aligned segments but include individual ones of duration information and size information respective to ones of the other ones of the aligned segments;
    switching code configured to cause the at least one processor to switch to one of a plurality of representations of the video data based on whether the timed metadata track indicates at least an overflow to an input buffer per each of the plurality of representations; and
    delivering code configured to cause the at least one processor to deliver the one of the plurality of representations to a client as a part of an event stream and based on at least one mode indicated in the event stream.

12. The apparatus according to claim 11, further comprising:
  determining code configured to cause the at least one processor to determine whether the at least one mode is an on-receive mode.

13. The apparatus according to claim 12, wherein the determining code is further configured to cause the at least one processor to determine, in a case where it is determined that the at least one mode is the on-receive mode, whether event message (emsg) information of the event stream indicate one or more of a first version emsg and a second version emsg.

14. The apparatus according to claim 13, further comprising:
  setting code configured to cause the at least one processor to set, in a case that the first version emsg is determined, presentation time information of an event of the event stream to zero in response to determining that at least one of a presentation time field and an event duration field of the event stream are zero.

15. The apparatus according to claim 13, further comprising:
  setting code configured to cause the at least one processor to set, in a case that the first version emsg is determined, message data of an event of the event stream to a predetermined message in response to determining that at least one of a presentation time field and an event duration field of the event stream are zero.

16. The apparatus according to claim 13, further comprising:
  setting code configured to cause the at least one processor to set, in a case that the first version emsg is determined, both presentation time information of an event of the event stream to zero and message data of an event of the event stream to a predetermined message in response to determining that at least one of a presentation time field and an event duration field of the event stream are zero.

17. The apparatus according to claim 13, further comprising:
  setting code configured to cause the at least one processor to set, in a case that the second version emsg is determined, presentation time information of an event of the event stream to zero in response to determining both that a presentation time field is equal to another presentation time and also that an event duration field is equal to zero.

18. The apparatus according to claim 13, further comprising:
  setting code configured to cause the at least one processor to set, in a case that the second version emsg is determined, message data of an event of the event stream to a predetermined message in response to determining both that a presentation time field is equal to another presentation time and also that an event duration field is equal to zero.

19. The apparatus according to claim 13, further comprising:
  setting code configured to cause the at least one processor to set, in a case that the second version emsg is determined, both presentation time information of an event of the event stream to zero and also message data of an event of the event stream to a predetermined message in response to determining both that a presentation time field is equal to another presentation time and also that an event duration field is equal to zero.

20. A non-transitory computer readable medium storing a program causing a computer to execute a process, the process comprising:
  obtaining video data;
  creating, based on the video data, a timed metadata track indicating a segment bandwidth and comprising information of a plurality of aligned segments of a media adaptation set such that duration information and size information of each of the aligned segments are all included in at least one metadata sample which is of a single segment of the aligned segments, and wherein metadata samples of other ones of the aligned segments do not include the duration information and the size information of said each of the aligned segments but include individual ones of duration information and size information respective to ones of the other ones of the aligned segments;

switching to one of a plurality of representations of the video data based on whether the timed metadata track indicates at least an overflow to an input buffer per each of the plurality of representations; and delivering the one of the plurality of representations to a client as a part of an event stream and based on at least one mode indicated in the event stream.

\* \* \* \* \*